United States Patent
Ishiguro

(10) Patent No.: US 10,185,490 B2
(45) Date of Patent: Jan. 22, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Taisuke Ishiguro, Kamagaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 176 days.

(21) Appl. No.: 14/794,564

(22) Filed: Jul. 8, 2015

(65) Prior Publication Data
US 2016/0011671 A1    Jan. 14, 2016

(30) Foreign Application Priority Data

Jul. 11, 2014   (JP) .................................. 2014-143673

(51) Int. Cl.
*G06F 3/0481*    (2013.01)
*G06F 3/0488*    (2013.01)
*G06F 3/00*    (2006.01)
*G06F 3/0484*    (2013.01)
*G06F 3/0483*    (2013.01)

(52) U.S. Cl.
CPC .......... *G06F 3/04883* (2013.01); *G06F 3/005* (2013.01); *G06F 3/0483* (2013.01); *G06F 3/04845* (2013.01)

(58) Field of Classification Search
CPC ............................. G06F 3/005; G06F 3/04883
See application file for complete search history.

(56) References Cited

U.S. PATENT DOCUMENTS

| | | | | |
|---|---|---|---|---|
| 5,844,547 A * | 12/1998 | Minakuchi | ............ | G06F 3/0481 345/156 |
| 6,590,568 B1 * | 7/2003 | Astala | ............ | G06F 3/0486 178/18.01 |
| 6,674,426 B1 * | 1/2004 | McGee | ............ | G06F 3/038 178/18.01 |
| 9,734,392 B2 * | 8/2017 | Suzuki | ............ | G06K 9/00355 |
| 2002/0036618 A1 * | 3/2002 | Wakai | ............ | G06F 3/017 345/157 |

(Continued)

FOREIGN PATENT DOCUMENTS

| | | |
|---|---|---|
| JP | 8-137609 A | 5/1996 |
| JP | 2012-058858 A | 3/2012 |
| WO | 2013/095679 A1 | 6/2013 |

*Primary Examiner* — Dorothy Harris
(74) *Attorney, Agent, or Firm* — Canon U.S.A., Inc. IP Division

(57) ABSTRACT

An information processing apparatus and an information processing method in which movement processing of the projected image is executed when first operation information indicating that change of instruction coordinates is within a predetermined range is not acquired, the movement processing of the projected image being based on second operation information involving transit from an instruction as to a first position to an instruction as to a second position on the projected image, and image processing of the projected image based on the second operation information is executed in a case where the first operation information has not been acquired, the second operation information being acquired after the first operation information.

17 Claims, 21 Drawing Sheets

(56) References Cited

U.S. PATENT DOCUMENTS

| | | | |
|---|---|---|---|
| 2006/0001650 A1* | 1/2006 | Robbins | G06F 3/0421 345/173 |
| 2010/0079405 A1* | 4/2010 | Bernstein | G06F 3/04883 345/174 |
| 2010/0199232 A1* | 8/2010 | Mistry | G06F 1/163 715/863 |
| 2011/0050608 A1* | 3/2011 | Homma | G06F 3/0414 345/173 |
| 2011/0157048 A1* | 6/2011 | Nakatani | G06F 3/0418 345/173 |
| 2012/0319971 A1* | 12/2012 | Eguchi | G06F 3/04883 345/173 |
| 2013/0021263 A1* | 1/2013 | Tong | G06F 3/04883 345/173 |
| 2013/0027318 A1* | 1/2013 | Lection | G06F 3/0486 345/173 |
| 2014/0086488 A1* | 3/2014 | Moteki | G06K 9/00483 382/182 |
| 2014/0204120 A1* | 7/2014 | Moteki | G06F 3/0416 345/633 |
| 2014/0208275 A1* | 7/2014 | Mongia | G06F 3/017 715/863 |
| 2014/0292648 A1* | 10/2014 | Matsuda | G06F 3/005 345/156 |

* cited by examiner

FIG. 5

| 501 | 502 | 506 | 503 | 507 | 504 | 508 | 505 | 509 |
|---|---|---|---|---|---|---|---|---|
| DOCUMENT ID | POSITION x0 | POSITION y0 | POSITION x1 | POSITION y1 | POSITION x2 | POSITION y2 | POSITION x3 | POSITION y3 |
| D001 | 110 | 140 | 340 | 140 | 110 | 440 | 340 | 440 |
| ... | ... | ... | ... | ... | ... | ... | ... | ... |
| ... | ... | ... | ... | ... | ... | ... | ... | ... |

FIG. 8

| OPERATION TIME (HOUR: MINUTE: SECOND) | POSITION x | POSITION y | TARGET DOCUMENT ID |
|---|---|---|---|
| 09:12:32.1 | 210 | 340 | D001 |
| 09:12:32.2 | 211 | 340 | D001 |
| 09:12:32.3 | 212 | 340 | D001 |
| 09:12:32.4 | 213 | 340 | D001 |
| ... | ... | ... | ... |
| 09:12:33.3 | 240 | 340 | D001 |

FIG. 10

| 1001 OPERATION TYPE | 1002 OPERATION TIME (HOUR: MINUTE: SECOND) | 1003 POSITION x | 1004 POSITION y | 1005 TARGET DOCUMENT ID |
|---|---|---|---|---|
| MOVEMENT | 09:12:32.1 | 210 | 340 | D001 |
| MOVEMENT | 09:12:32.2 | 211 | 340 | D001 |
| MOVEMENT | 09:12:32.3 | 212 | 340 | D001 |
| MOVEMENT | 09:12:32.4 | 213 | 340 | D001 |
| ... | ... | ... | ... | ... |
| MOVEMENT | 09:12:33.3 | 240 | 340 | D001 |

FIG. 11

| OPERATION TIME (HOUR:MINUTE:SECOND) | POSITION x | POSITION y |
|---|---|---|
| 09:12:32.1 | 120 | 400 |
| 09:12:32.2 | 120 | 400 |
| 09:12:32.3 | 120 | 400 |
| 09:12:32.4 | 120 | 400 |
| ... | ... | ... |
| 09:12:33.3 | 120 | 400 |

FIG. 14

| DOCUMENT ID 1401 | POSITION x0 1402 | POSITION y0 1406 | POSITION x1 1403 | POSITION y1 1407 | POSITION x2 1404 | POSITION y2 1408 | POSITION x3 1405 | POSITION y3 1409 | DOCUMENT TYPE 1410 |
|---|---|---|---|---|---|---|---|---|---|
| D001 | 110 | 140 | 340 | 140 | 110 | 440 | 340 | 440 | PAPER DOCUMENT |
| D002 | 470 | 160 | 700 | 100 | 550 | 440 | 770 | 380 | PROJECTED DOCUMENT |
| ... | ... | ... | ... | ... | ... | ... | ... | ... | |

FIG. 17

| | 1701 | 1702 | 1703 | 1704 | 1705 |
|---|---|---|---|---|---|
| | OPERATOR ID | OPERATION TIME | POSITION x | POSITION y | TARGET DOCUMENT ID |
| | 001 | 09:12:32.1 | 210 | 340 | D001 |
| | 002 | 09:12:32.1 | 400 | 100 | D002 |
| | 001 | 09:12:32.2 | 211 | 340 | D001 |
| | 002 | 09:12:32.2 | 400 | 100 | D002 |
| | 001 | 09:12:32.3 | 212 | 340 | D001 |
| | 002 | 09:12:32.3 | 400 | 100 | D002 |
| | 001 | 09:12:32.4 | 213 | 340 | D001 |
| | 002 | 09:12:32.4 | 400 | 100 | D002 |
| | 001 | ... | ... | ... | ... |
| | 002 | ... | ... | ... | ... |
| | 001 | 09:12:33.3 | 240 | 340 | D001 |
| | 002 | 09:12:33.3 | 400 | 100 | D002 |

INFORMATION PROCESSING APPARATUS, INFORMATION PROCESSING METHOD, AND STORAGE MEDIUM

BACKGROUND OF THE INVENTION

Field of the Invention

The present disclosure generally relates to information processing and, more particularly, to an information processing apparatus, an information processing method, and a storage medium for handling document information.

Description of the Related Art

A technique for handling document information through a touch operation on tablet terminals or smartphones has been known. For example, with a technique discussed in Japanese Patent Application Laid-Open No. 8-137609, a user viewing a document on a tablet terminal can perform writing and the like on the document through a pen operation of touching the tablet terminal with a pen.

Furthermore, a technique for handling document information through a gesture detected by a sensor is also available. With these techniques, an operation instruction can be issued through the touch operation or the gesture operation, and thus a special operation device such as a mouse and a keyboard needs not to be prepared.

In Japanese Patent Application Laid-Open No. 8-137609, a mode of the pen operation is determined as cursor movement, range designation, gesture, or hand written character input, based on a pen input time and a pen movement amount. Here, the mode is determined through recognition of the pen operation.

However, some operations are not clearly different from each other in an operation time and an operation movement amount, and thus are difficult to be distinguished from each other. For example, an operation of moving a document and an operation of instructing writing into the document are implemented through the same operation, and thus are difficult to be distinguished from each other. For example, when a finger is used for the touch operation, the operation for moving the document is performed by moving the finger in a direction in which the document is to be moved. On the other hand, an operation of writing a line is performed by moving the finger in a direction in which the line is to be drawn. Thus, the operations both involve the movement of the finger in a certain direction. Therefore, it is difficult to determine whether the finger is moved to move the document or to draw a line.

Furthermore, in Japanese Patent Application Laid-Open No. 8-137609, the mode of the pen operation cannot be correctly determined when the pen operation starts, because the mode of the pen operation can be determined through recognition of the pen operation. Thus, response of the terminal to a user's intention corresponding to the pen operation may be slow or wrong.

SUMMARY OF THE INVENTION

The present disclosure is directed to an information processing apparatus, an information processing method, and a storage medium with which hard-to-distinguish operations can be easily distinguished from each other.

According to an aspect of the present disclosure, an information processing apparatus includes a projection unit, an acquisition unit configured to acquire operation information as an instruction as to an image projected on a projection surface by the projection unit, and an execution unit configured to execute movement processing of the projected image based on second operation information involving transit from an instruction as to a first position to an instruction as to a second position of the projected image in a case where the acquisition unit has not acquired first operation information indicating that change of instruction coordinates is within a predetermined range, and to execute image processing based on the second operation information in a case where the acquisition unit has acquired the first operation information, the second operation information being acquired after the first operation information.

Further features of the present disclosure will become apparent from the following description of exemplary embodiments with reference to the attached drawings.

BRIEF DESCRIPTION OF THE DRAWINGS

FIG. 5 is a diagram illustrating an example of document information according to the first exemplary embodiment of the present disclosure.

FIG. 8 is a diagram illustrating an example of operation information according to the first exemplary embodiment of the present disclosure.

FIG. 10 is a diagram illustrating an example of an operation information table according to the first exemplary embodiment of the present disclosure.

FIG. 11 is a diagram illustrating an example of holding operation information according to the first exemplary embodiment of the present disclosure.

FIG. 14 is a diagram illustrating an example of document information according to the second exemplary embodiment of the present disclosure.

FIG. 17 is a diagram illustrating an example of operation information according to the sixth exemplary embodiment of the present disclosure.

DESCRIPTION OF THE EMBODIMENTS

Exemplary embodiments of the present disclosure are described in detail below with reference to attached drawings.

Figure 1A:
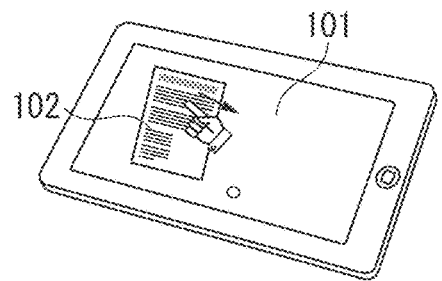
FIGS. 1A, 1B, and 1C are schematic diagrams illustrating document information handling according to exemplary embodiments of the present disclosure.

A first exemplary embodiment of the present disclosure is described below. First, an overview of processing executed by an information processing apparatus according to the present exemplary embodiment is described with reference to FIGS. 1A, 1B, and 1C. According to the present exemplary embodiment, a tablet terminal 101 including a touch panel is used. The tablet terminal 101 can display a document image 102. A movement operation and a writing operation can be performed on the document image 102 through a touch operation. However, it is difficult to distinguish between the movement operation and the writing operation when such operations are performed. In the information processing apparatus, movement permission determination is performed to distinguish between the movement operation and the writing operation. More specifically, the information processing apparatus detects whether an operation of holding the document image is performed, in addition to the movement or the writing operation. When the holding operation is detected, the movement is not permitted.

Figure 1B:
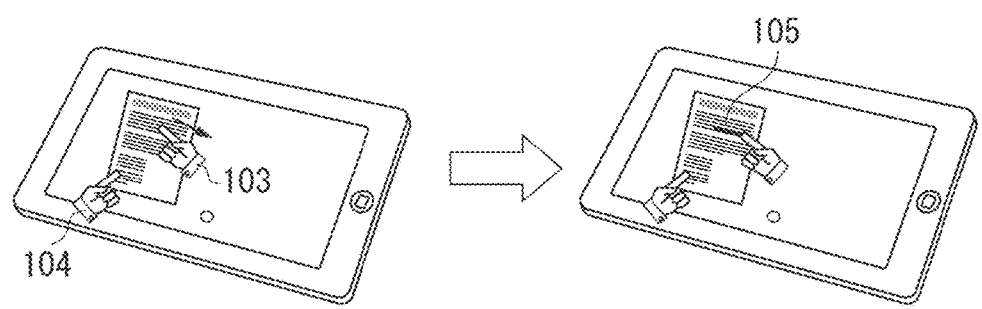
Figure 1C:
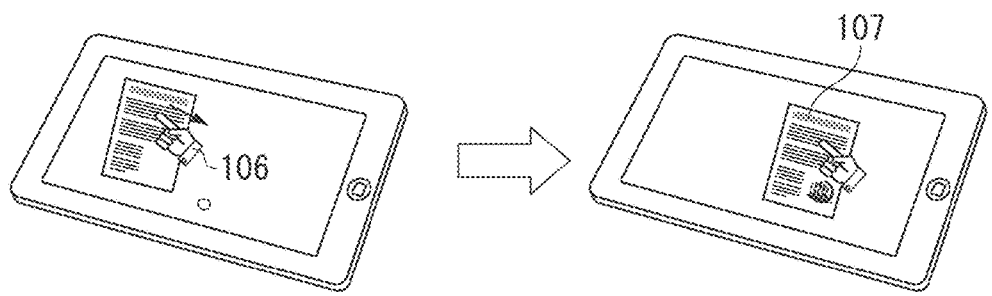

Referring to FIG. 1B, a holding operation 104 is performed on the document image 102 in addition to an operation 103. Accordingly, it is determined that the operation 103 is not the movement operation, whereby a result 105 of the writing operation is reflected. On the other hand, in FIG. 1C, the holding operation is not performed on the document image 102 in addition to an operation 106. Accordingly, the operation 106 is determined as the movement operation, and a result 107 of the movement operation is reflected.

The present exemplary embodiments are described in detail below with reference to FIGS. 2 to 21.

Figure 2:
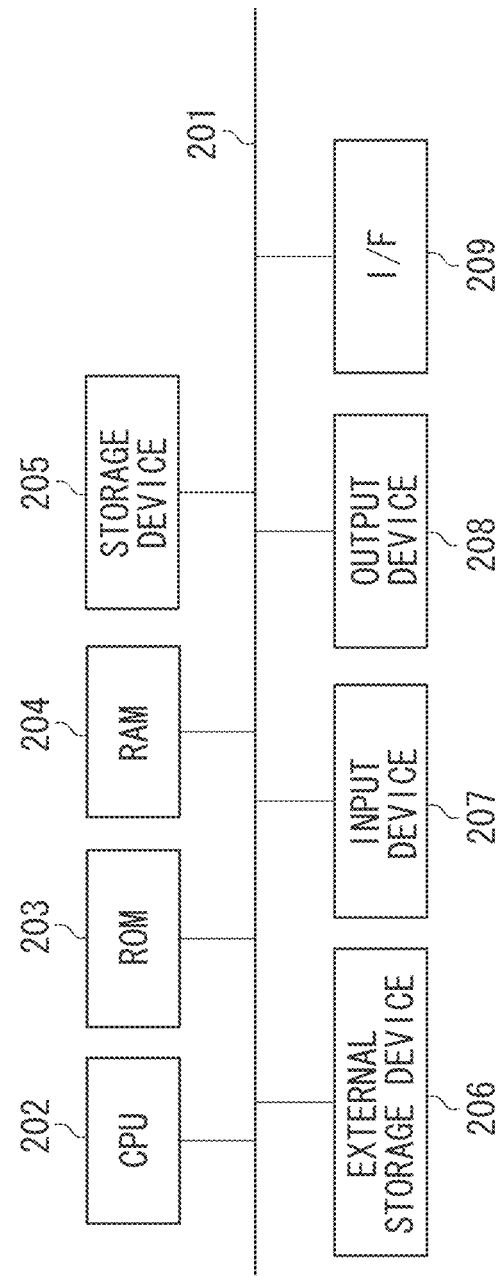
FIG. 2 is a diagram illustrating an example of a hardware configuration according to the exemplary embodiments of the present disclosure.

FIG. 2 illustrates an example of a hardware configuration of the information processing apparatus (hereinafter, also referred to as a document processing system) according to the exemplary embodiment of the present disclosure.

A central processing unit (CPU) 202 performs calculations and logical decisions for various processing, and controls various components connected to a bus 201. As used herein, the term "unit" generally refers to any combination of software, firmware, hardware, or other component, such as circuitry, that is used to effectuate a purpose.

In the document processing system, a memory including a program memory and a data memory is mounted. The program memory stores a program for control to be performed by the CPU 202, including various processing procedures described below with reference to flowcharts. This memory may be a read-only memory (ROM) 203, a random access memory (RAM) 204 onto which a program is loaded from an external storage device, or a combination of these memories.

A storage device 205 is a device such as a hard disk that stores data and a program related to the present exemplary embodiment. According to the present exemplary embodiment, the storage device 205 is also used for storing photographs and documents. A data storage device (not illustrated) that is externally connected or connected to a network may be used as the device that stores the photographs, the documents, and the like. An external storage device 206 may be realized by a medium (storage medium) and an external storage drive for accessing the medium such as a flexible disk (FD), a CD-ROM, a digital versatile disc (DVD), a universal serial bus (USB) memory, a magneto-optical (MO) disk, or a flash memory.

An input device 207 receives an instruction from a user and inputs the instruction to the information processing apparatus. The user issues an instruction to a document processing apparatus through the input device 207. The input device 207 can be realized by a touch panel that can detect a touch instruction from the user or a sensor that can detect an instruction by gesture from the user.

An output device 208 is a display unit that displays and outputs a processing result and the like. The output device 208 can be realized by a display device such as a liquid crystal display or a cathode-ray tube (CRT) including an output circuit. According to the present exemplary embodiment, document and the like are displayed on the output device 208.

An interface (hereinafter, referred to as I/F) 209 mediates the transaction of information. Data is transmitted to and from an external apparatus via the I/F 209.

Figure 3:
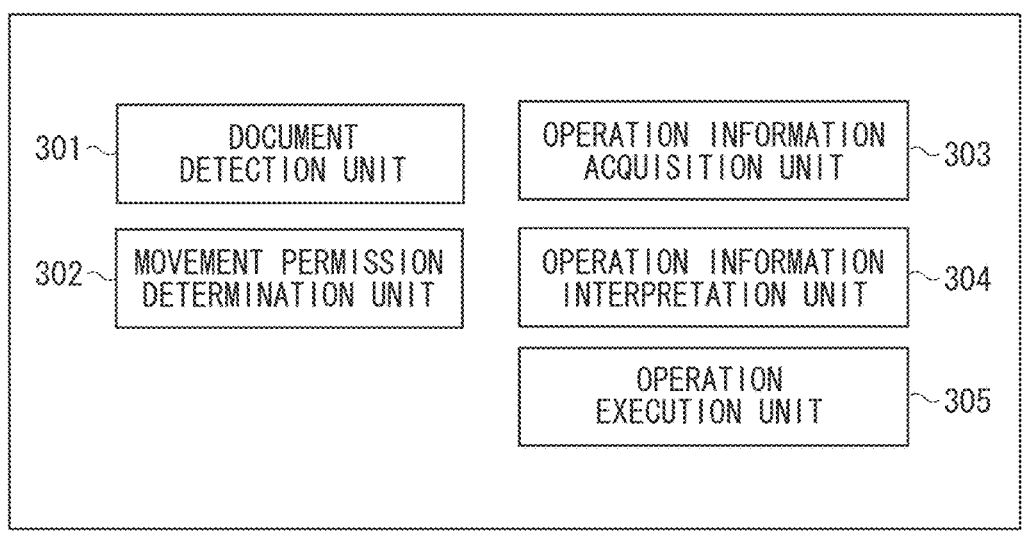
FIG. 3 is a block diagram illustrating a configuration of a document processing system according to the exemplary embodiments of the present disclosure.

FIG. 3 is a block diagram illustrating a configuration of the document processing apparatus according to the exemplary embodiment of the present disclosure. The document processing apparatus includes a document detection unit 301, a movement permission determination unit 302, an operation information acquisition unit 303, an operation information interpretation unit 304, and an operation execution unit 305.

The document detection unit 301 detects the document image output and displayed on the tablet terminal. Document information detection processing is described below in detail.

The movement permission determination unit 302 determines whether to permit the movement of a document image based on the document information detected by the document detection unit 301. The movement permission determination processing is described below in detail.

The operation information acquisition unit 303 acquires information about an operation performed on the tablet terminal. Operation information acquisition processing is described below.

The operation information interpretation unit 304 determines a type of the operation indicated by the operation information. More specifically, the type of the operation, which is indicated by the operation information acquired by the operation information acquisition unit 303, is determined based on the determination result of the movement permission determination unit 302. When the determination result of the movement permission determination unit 302 is "movement permitted", the operation information acquired by the operation information acquisition unit 303 is interpreted as the movement operation. On the other hand, when the determination result of the movement permission determination unit 302 is "movement prohibited", the operation information acquired by the operation information acquisition unit 303 is interpreted as an image processing operation such as the writing operation or flicking operation, for example.

The operation execution unit 305 executes the actual operation based on the result of interpreting the operation information by the operation information interpretation unit 304.

The components illustrated in the block diagram are controlled by the CPU 202 in FIG. 2. As described above, the various processing procedures are described in detail below.

Figure 4:
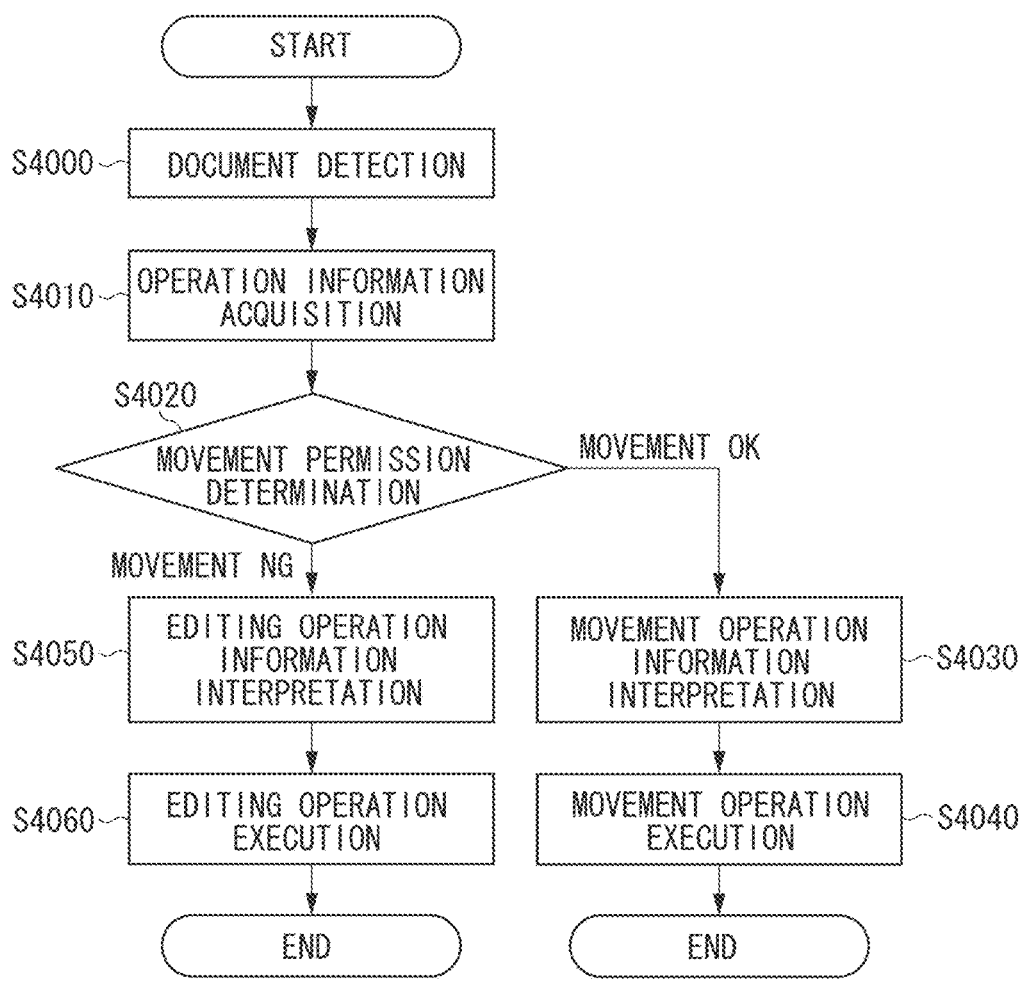
FIG. 4 is a flowchart illustrating an overall flow of processing in a document processing system according to a first exemplary embodiment of the present disclosure.

FIG. 4 is a flowchart illustrating an overall flow of processing in the document processing apparatus according to the present exemplary embodiment.

Figure 6:
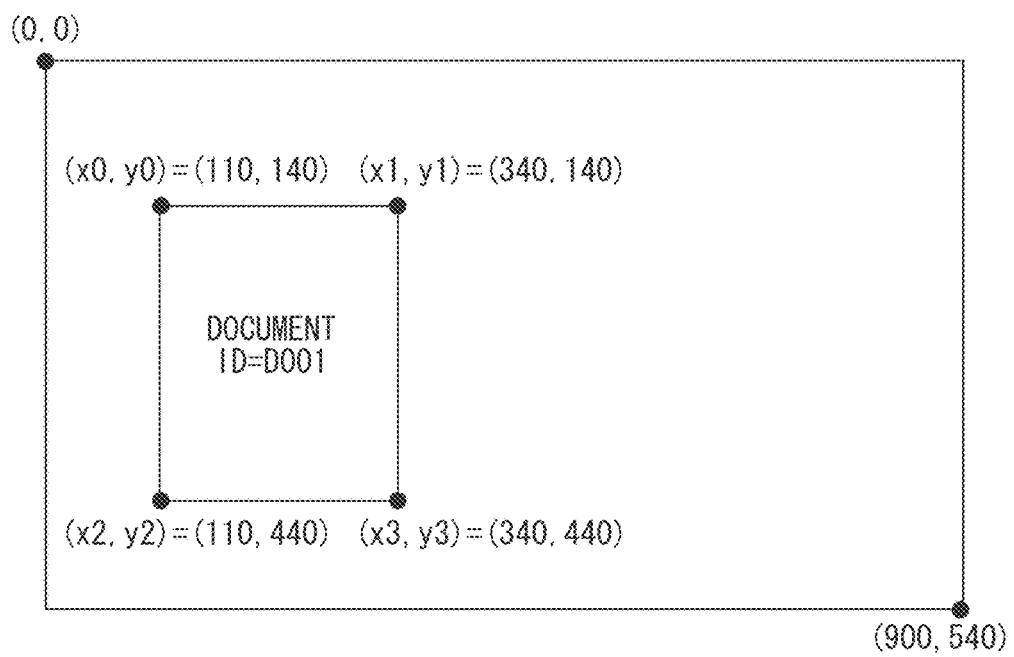
FIG. 6 is a diagram illustrating an example of a document arranged state according to the first exemplary embodiment of the present disclosure.

In step S4000, the document detection processing is executed. In the document detection processing, the document detection unit 301 described above with reference to FIG. 3 detects the document information about the document image displayed on the tablet terminal. More specifically, the display position and the size of a document image output for the display from the document processing apparatus are acquired as the document information. FIG. 5 illustrates an example of the acquired document information. The document information includes a document identification (ID) 501 for uniquely identifying the document image, as well as x coordinates (502 to 505) and y coordinates (506 to 509) at four corners indicating the position and the size of the document image. Each of the coordinates is represented in a coordinate system having an upper left corner of the display of the tablet terminal as an origin. FIG. 6 illustrates the position and the size of a document image having D001 as the document ID in FIG. 5.

In step S4010, the operation information acquisition processing is executed. In the operation information acquisition processing, the operation information acquisition unit 303 described above with reference to FIG. 3, acquires the information about the operation performed on the document image with the touch panel mounted on the tablet terminal. More specifically, instruction coordinates on the touch panel are acquired. When the operation is continuously performed, the coordinates are acquired along a trail of the operation. Then, the operation is associated with the document image as the operation target. In the document association processing, the document image as the operation target is identified in accordance with the document information (the display position and the size of the document) acquired by the document detection processing in step S4000. The document association processing is executed by determining whether an operation is performed within a document area held in the document information. The operation that is performed within the document area is treated as the instruction to the document image. On the other hand, if the operation is performed outside the document area, the processing of associating the operation with the document image is not performed.

Figure 7:
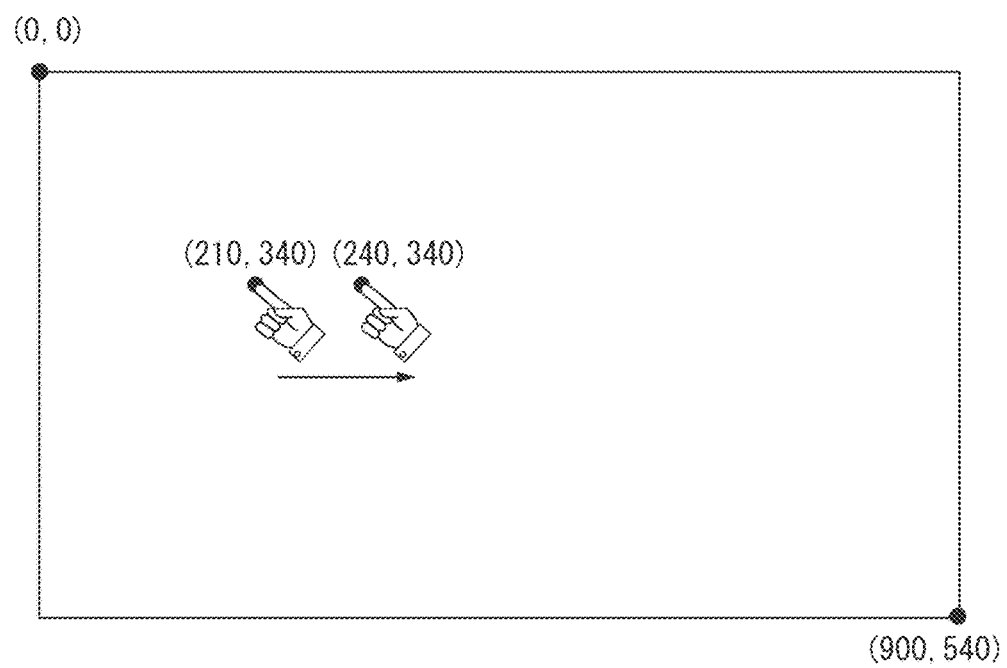
FIG. 7 is a schematic diagram illustrating an overview of an operation instruction according to the first exemplary embodiment of the present disclosure.

FIG. 7 is a diagram illustrating an overview of an operation instruction. In the example illustrated in FIG. 7, an operation is performed from coordinates (210,340) to coordinates (240,340). In the operation information acquisition processing, the operation thus performed is acquired as a set of coordinates, time, and the operation target document. FIG. 8 illustrates an example of the acquired operation information. The operation information includes an operation time 801, an operation position x coordinate 802, an operation position y coordinate 803, and a target document ID 804 for uniquely identifying the operation target document. In the example illustrated in FIG. 8, an instruction is issued to (x, y)=(210,340) at 09:12:32.1. Then, it is determined whether the document information acquired in step S4000 includes the instruction coordinates. The document information including the instruction coordinates is identified as the operation target document. For example, when the acquired document information is the one illustrated in FIG. 5, the document D001 is the operation target of the instruction issued at 09:12:32.1 because the document D001 includes the instruction coordinates. Referring back to FIG. 8, an instruction is then issued to (x, y)=(211,340) in the target document D001 at 09:12:32.2. Similarly, the operation continues until 09:12:33.3 at which the instruction is completed at (x, y)=(240,340) in the target document D001. According to the present exemplary embodiment, the instruction coordinates are acquired every 0.1 second as an example of a predetermined time. However, the predetermined time may be of a different value. For example, when the instruction coordinates are acquired at a shorter interval, more detailed information can be acquired, whereby the information can be expressed in detail when a curve or the like is input. On the other hand, when the instruction coordinates are acquired at a longer interval, the information cannot be expressed in detail, but a processing load can be reduced.

According to the present exemplary embodiment, the document image including the instruction coordinates in its document information is identified as the operation target document. However, a different method may be employed. For example, coordinates at the operation start point may be inside the document image, and the coordinates at the operation end point may be outside the document image. By thus allowing the operation to be performed outside the document image, a long distance movement can be easily instructed.

In step S4020, the movement permission determination processing is executed. In the movement permission determination processing, the movement permission determination unit 302 described above with reference to FIG. 3, determines whether the movement of the displayed document image is permitted. The movement permission determination processing is described below with reference to FIG. 9. When the result of the movement permission determination processing is "movement OK", the processing proceeds to step S4030. On the other hand, when the result of the movement permission determination processing is "movement NG", the processing proceeds to step S4050.

In step S4030, the movement operation information interpretation processing is executed. In the movement operation information interpretation processing, the operation information interpretation unit 304 described above with reference to FIG. 3, interprets the operation information acquired in step S4010 as the movement operation. The interpreted information is stored in an operation information table as illustrated in FIG. 10 as an example. The operation information table includes an operation type 1001, an operation time 1002, an operation position x coordinate 1003, an operation position y coordinate 1004, and a target document ID 1005 for uniquely identifying the operation target document. The operation type 1001 indicates the type of the operation information indicated by the operation time 1002, the operation position x coordinate 1003, the operation position y coordinate 1004, and the target document ID 1005.

In step S4040, the movement operation execution processing is executed. In the movement operation execution processing, the operation execution unit 305 described above with reference to FIG. 3, refers to the operation information table set in step S4030, and executes the actual operation processing.

In step S4050, processing for interpreting editing operation information is executed. In the processing for interpreting the editing operation information interpretation processing, the operation information interpretation unit 304 described above with reference to FIG. 3, interprets the operation information acquired in step S4010 as an editing operation of writing. The interpreted information is stored in the operation information table as in the processing in step S4030.

In step S4060, the editing operation execution processing is executed. In the editing operation execution processing, the operation execution unit 305 described above with reference to FIG. 3, refers to the operation information table set in step S4050, and executes the actual operation processing.

Figure 9:
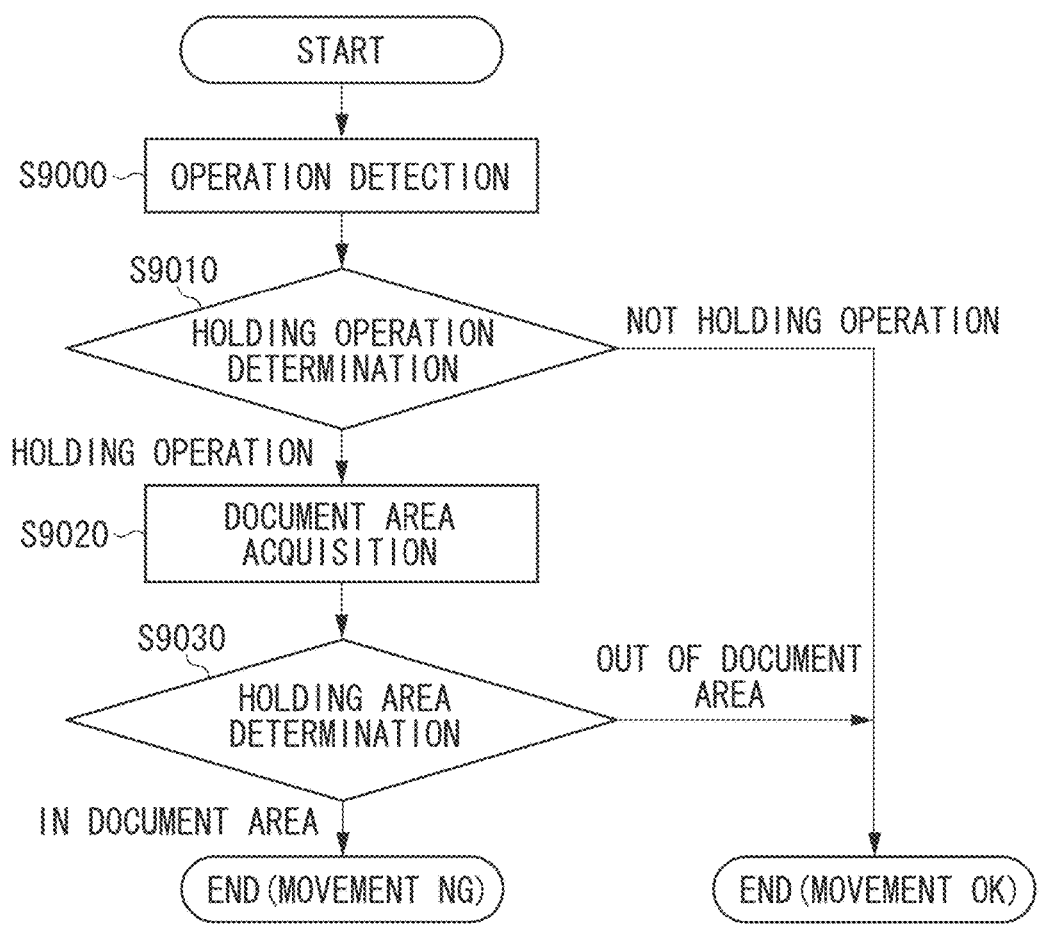
FIG. 9 is a flowchart illustrating a flow of movement permission determination processing according to the first exemplary embodiment of the present disclosure.

Next, the movement permission determination processing in step S4020 in FIG. 4 will be described in detail. FIG. 9 is a flowchart illustrating a flow of the movement permission determination processing.

In step S9000, the operation detection processing is executed. The operation detection processing detects an operation performed on the touch panel of the tablet terminal, and indicates the information acquired in step S4010. The operation information includes a holding operation position and an operation time, as in the case of the operation information described with reference to FIG. 8.

In step S9010, the holding operation determination processing is executed. In the holding operation determination processing, it is determined whether the operation information acquired in step S9000 indicates the holding operation. The determination is made based on change in the instruction coordinates within a range between the current time point and an earlier time point going back from the current time point by a predetermined time period. More specifically, when the instruction coordinates have changed within the predetermined time range, it is determined that the holding operation is not performed. On the other hand, when the instruction coordinates have not changed, it is determined that the holding operation is performed. FIG. 11 illustrates an example of the holding operation information. Information determined as the holding operation information, is deleted from the operation information acquired in step S4010, and the remaining operation information is stored in the storage device 205 as illustrated in FIG. 2.

When the result of the holding operation determination processing indicates that the holding operation is performed, the processing proceeds to step S9020. On the other hand, when the result of the holding operation determination processing indicates that the holding operation is not performed, the movement permission determination processing is determined to be "movement OK", and the processing is terminated.

According to the present exemplary embodiment, it is determined that the holding operation is not performed when the instruction coordinates have changed. Alternatively, it may be determined that the holding operation is performed when the instruction coordinates have changed. For example, it may be determined that the holding operation is performed when the instruction coordinates have changed within a predetermined range. It may be determined that the user is holding different positions even if the user means to hold the same position, depending on accuracy of the touch panel. By setting the allowable range to the change of the instruction coordinates, the determination processing can be flexibly executed.

In step S9020, document area acquisition processing is executed. In the document area acquisition processing, a document area is acquired from the document information as illustrated in FIG. 5 as an example. More specifically, values of the x coordinates (502 to 505) and the y coordinates (506 to 509) as illustrated in FIG. 5 are acquired.

In step S9030, holding area determination processing is executed. In the holding area determination processing, it is determined whether the document area acquired in step S9020 includes the coordinates indicated by the holding operation information acquired in step S9000. The operation information and the document area are each acquired as coordinate information. Thus, whether the document area includes the coordinates indicated by the holding operation information can be determined by comparing the coordinate information. When it is determined that the holding operation is performed in the document area, the movement permission determination processing is determined to be "movement NG", and the processing is terminated. When it is determined that the holding operation is not performed in the document area, the movement permission determination processing is determined to be "movement OK", and the processing is terminated.

According to the present exemplary embodiment, it is determined whether the document movement is permitted based on whether the operation of holding the document image is performed. An action corresponding to the operation of holding the document image is generally performed on a paper document to prevent the paper document from moving, and thus the user can be free from uncomfortable feeling when performing the holding operation on the displayed document image.

According to the present exemplary embodiment, a holding operation is a continuous operation performed while a series of operations is being performed. Alternatively, the holding operation may not be a continuous operation. For example, the holding operation may be activated when the holding operation is carried out before the series of operations is performed. Thus, even when the holding operation is not continuously performed, the movement permission determination that has been made previously continues to be effective while the series of operations is being performed. Then, the movement permission determination is made again after the series of operations is terminated.

According to the present exemplary embodiment, it is determined that the holding operation is put into execution when the holding operation is performed while the series of operations is performed. Alternatively, the holding operation may be performed at timing different from timing of the operations such as movement and editing. For example, the holding operation is activated when the holding operation is performed before the series of operations is carried out. The holding operation is deactivated when the holding operation is performed again. The series of operations is treated as "movement NG" while the holding operation is active. Through such processing, the holding operation can be performed at the timing different from the timing of the operations such as the movement and the editing.

As described above in detail, the movement permission determination is performed on the document information. Then, the information about the operation performed on the document image is interpreted by using the determination result. Thus, a plurality of operation types can be distinguished from each other with a simple operation. Further, if the operation after the movement permission determination has been made is started, the operation is smoothly reflected on the document information because the operation type has been correctly determined. Accordingly, response to the operation can be improved.

According to the present exemplary embodiment, only the writing is described as the editing operation. However, the present disclosure can be applied to other operations such as an operation of moving a finger for selecting a partial area on the document image. More specifically, an interpretation result made in the editing operation information interpretation processing described with reference to step S4050 in FIG. 4 is set as area selection to the operation type 1001 in the operation information table illustrated in FIG. 10 as an example. Then, in the editing operation execution processing described with reference to step S4060, a rectangular area with two diagonal corners at the operation start coordinates and the operation end coordinates stored in the operation information table is set as the selected area. Thus, the present exemplary embodiment can be applied to selection processing on a partial area.

According to the present exemplary embodiment, the movement operation is described as an operation of moving the position of the document information image. The movement operation further includes other operations such as page switching through a swiping operation. It is difficult to distinguish between the page switching through the swiping operation and writing through a sliding operation. The movement permission determination processing is also applied to the page switching through the swiping operation. More specifically, the swiping operation can be activated when the movement is permitted by the movement permission determination processing, and can be deactivated when the movement is not permitted.

A second exemplary embodiment of the present disclosure is described below. According to the first exemplary embodiment, the present disclosure is applied to the document information operation in the tablet terminal. According to the present exemplary embodiment, the present disclosure is applied to the document information operations in different terminals. More specifically, an example is described where the present exemplary embodiment is applied to an information processing apparatus in which a projector projects the document information, and a sensor acquires information about an operation performed on the projected image on a projection surface.

Figure 12:
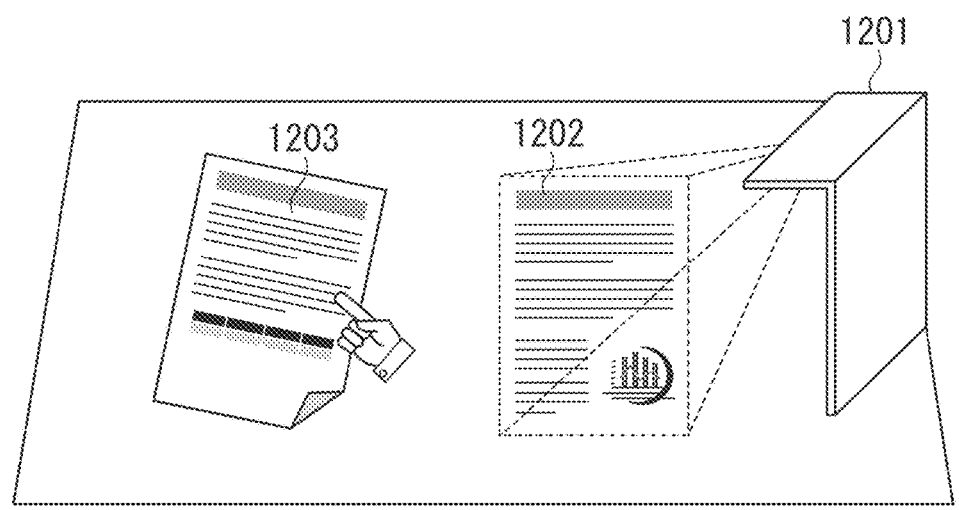
FIG. 12 is a schematic diagram illustrating an overview of a document processing system according to a second exemplary embodiment of the present disclosure.

FIG. 12 is a diagram illustrating an overview of document processing according to the present exemplary embodiment. An information processing apparatus 1201 includes a projector that projects an image and a sensor that detects an operation by gesture on a projection surface. A projected document 1202 (projected image) is a document image projected by the information processing apparatus 1201. A paper document 1203 is a document sheet surface disposed on the projection surface of the projector. The user issues an operation instruction to the projected document 1202 and the paper document 1203 through the gesture operation, and thus performs an editing operation such as writing of information. With the information processing apparatus 1201, a digital image stored in the information processing apparatus 1201 can be projected without using a display device, and the projected image can be operated. Furthermore, the digital image can be projected to be superimposed on a tangible content such as a paper document. Thus, a document operation can be efficiently performed when the paper document and the projected image are mixed for document work.

Figure 21:
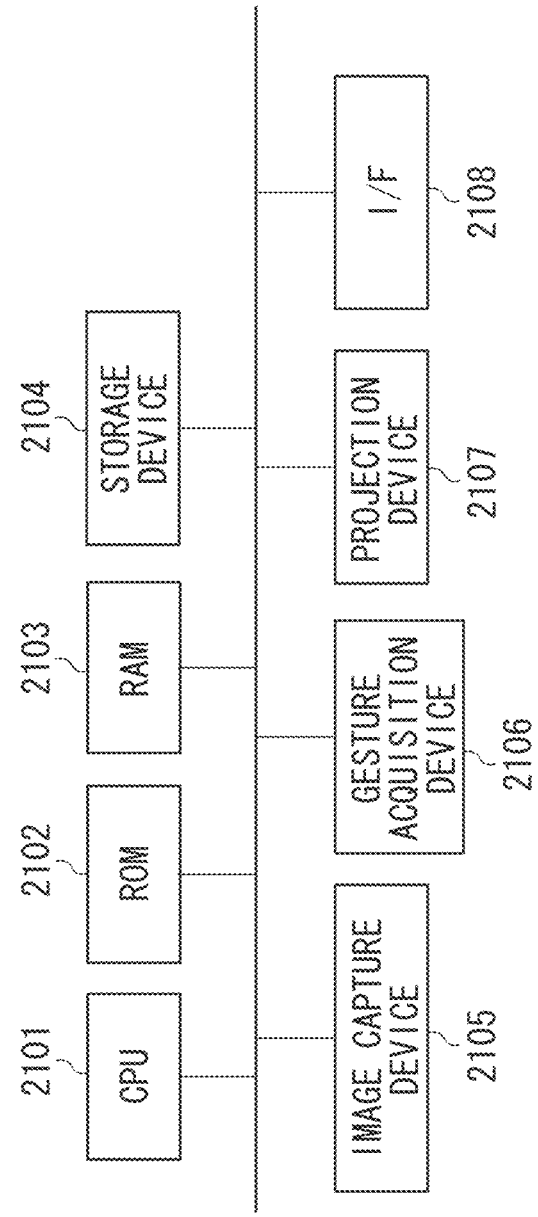
FIG. 21 is a diagram illustrating an example of a hardware configuration according to the seventh exemplary embodiments of the present disclosure.

FIG. 21 illustrates an example of a hardware configuration of the information processing apparatus 1201.

A CPU 2101, a ROM 2102, a RAM 2103, a storage device 2104, and an I/F 2108 are respectively similar to the CPU 202, the ROM 203, the RAM 204, the storage device 205, and the I/F 209.

An image capture device 2105 captures an image of the document with a camera. A gesture acquisition device 2106 is a sensor that acquires a gesture of the user. A projection device 2107 projects a projection image on a desk for example.

An example is described below where the exemplary embodiment is applied to the document processing apparatus. Overall processing in the document processing apparatus is similar to that in FIG. 4 according to the first exemplary embodiment, except for step S4000 (document detection processing) and step S4040 (movement operation execution processing).

Figure 13:
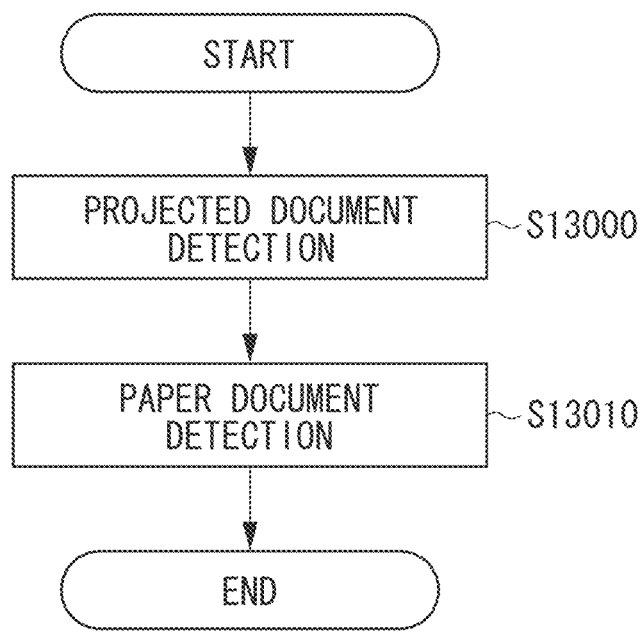
FIG. 13 is a flowchart illustrating a flow of document detection processing according to the second exemplary embodiment of the present disclosure.

The present exemplary embodiment involves a paper document in addition to the digital image projected and displayed as a document image. Thus, in the document detection processing, the paper document needs to be detected in addition to the projection document. FIG. 13 is a flowchart illustrating a flow of document detection processing in the present exemplary embodiment.

In step S13000, the projected document detection processing is executed, in which the display position and the size of the document being projected are detected as the document information. This processing can be implemented in a manner similar to that in the processing in step S4000 in FIG. 4 described above.

Step S13010 is paper document detection processing in which the position and the size of the paper document disposed on a projection surface, are detected as the document information. More specifically, placement of the paper document is detected by an infrared sensor mounted on the information processing apparatus 1201. The placement of the paper document can be detected by previously acquiring information about the projection surface before the paper document is placed with an infrared sensor, and by constantly comparing the information with information acquired by the infrared sensor at an optional time point. In other words, an area involving change in the information acquired by the infrared sensor is detected as the document area, with which the position and the size of the paper document can be acquired.

Figure 15:
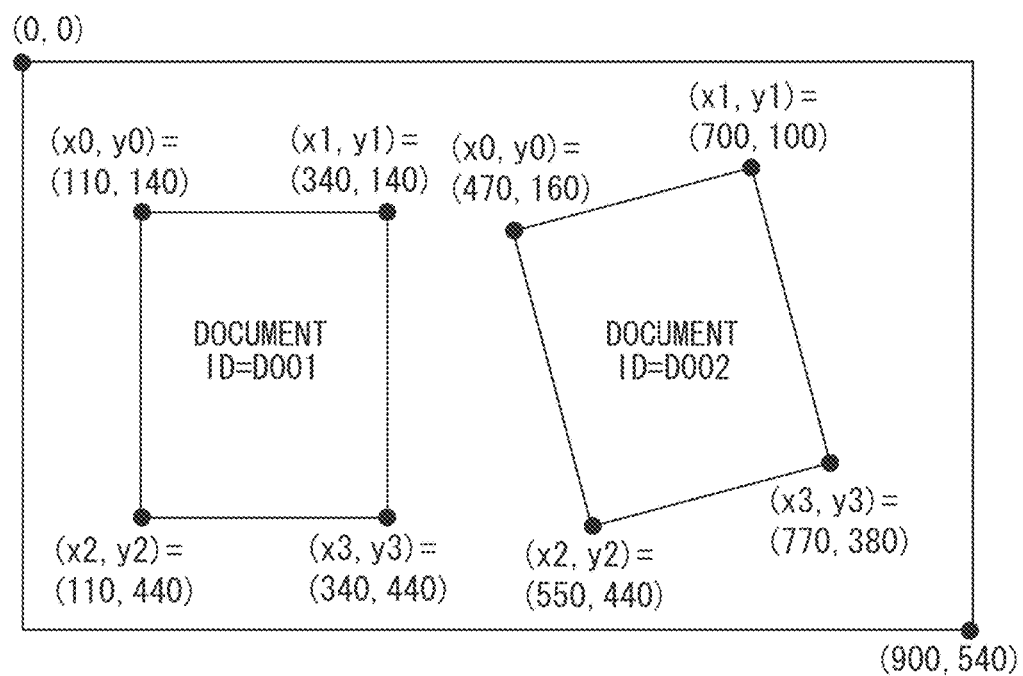
FIG. 15 is a diagram illustrating an example of a document arranged state according to the second exemplary embodiment of the present disclosure.

FIG. 14 illustrates an example of document information obtained as a document detection processing result. As in FIG. 5, the document information includes a document ID 1401 for uniquely identifying a document, x coordinates (1402 to 1405) and y coordinates (1406 to 1409) at four corners indicating the position and the size of the document information, and a document type (1410) indicating the type of the detected document. FIG. 15 is a diagram illustrating the position and the size of the document indicated by the document information in FIG. 14.

According to the present exemplary embodiment, the information acquired by the infrared sensor is used for detecting the paper document. Alternatively, the paper document can be detected with other methods. For example, a document area detection technique can be employed in which the document area is detected from image information that can be acquired by the image capture device such as a camera. An example of a known document area detection technique includes a technique of detecting edges forming a straight line from a group of edges in an image, and estimating four sides of the document area from the straight line.

Next, movement operation execution processing according to the present exemplary embodiment will be described. In the movement operation execution processing, the document type of an operation target is acquired. When the document type of the operation target is the projected document image, the display position of the projected document image is moved by an amount indicated by the operation information. On the other hand, when the document type of the operation target is the paper document, the processing is terminated without executing the movement operation. More specifically, the movement operation processing needs not to be executed in this case because the paper document is moved during the user operation.

According to the present exemplary embodiment, as an example, the documents do not overlap with each other. Alternatively, the present exemplary embodiment may be applied to a case where the documents overlap with each other. More specifically, in the document detection processing described with reference to FIG. 13, the documents, of which the positions and the sizes are detected, may overlap with each other. Then, in the holding area determination processing in step S9030 in FIG. 9, it is determined that the overlapping area is within the document area, so that the processing can be applied to the documents overlapping with each other. Here, the information about the holding operation performed on the upper document is acquired as the holding operation information associated with the lower document information.

As described above in detail, difficult-to-distinguish operations on the projected document and the paper document can be distinguished from each other. Furthermore, the intended operation can be correctly reflected without converting the paper document into the digital image through scanning or the like. Thus, the load of the document operation can be reduced.

A third exemplary embodiment of the present disclosure is described below. According to the first and the second exemplary embodiments, the method for detecting the holding operation performed on the document image by touching or gesture is employed to determine whether the movement of the document image is permitted. Alternatively, whether the movement is permitted may be determined with an object other than fingers or hands. More specifically, the movement permission determination can be made by detecting whether an object such as a paperweight or a push pin is placed.

This processing is described below. In the operation detection processing in step S9000 in FIG. 9, the object such as the paperweight or the push pin is detected, and the position and the time at which the object is placed are acquired. The acquired information is stored as the position and the time information as shown in FIG. 8. The object can be detected with a known object detection technique. For example, an object may be detected by storing an image of the object in advance, and determining whether the stored image is placed, from the captured image of the projection surface. The processing other than the holding operation detection processing can be implemented with the processing that is similar to that in the first exemplary embodiment.

Alternatively, other methods may be used to detect the object. More specifically, placement of the object can be detected by a sensor that detects the weight of the object.

As described above, control can be performed not only by a human operation such as touching or gesture but also can be performed with a physically tangible object by detecting the object other than the fingers or hands in the movement permission determination processing. By thus applying an object generally used for a paper document to the projected/displayed information, the difficult-to-distinguish operations can be easily distinguished from each other through a natural and comfortable operation.

A fourth exemplary embodiment of the present disclosure is described below. According to the third exemplary embodiment, the method for using the physical object is described as the movement permission determination for the document image. Alternatively, an explicit operation device can also be used to perform the movement permission determination. For example, the movement permission determination may be made based on whether a relevant pedal or button is pressed.

More specifically, in the operation detection processing in step S9000 in FIG. 9, whether the pedal or the button is pressed is determined. The other processing in the fourth exemplary embodiment is similar to that described in the first exemplary embodiment. Here, as an operation detection method, it is determined that "holding is ON" when the pedal or the button is being pressed, and that "holding is OFF" when the pedal or the button is not being pressed.

According to the present exemplary embodiment, it is determined that "holding is ON" when the pedal or the button is being pressed. Conversely, it may be determined that "holding is OFF" when the pedal or the button is being pressed. Moreover, switching between the "holding is ON" state and the "holding is OFF" state may be performed every time the pedal or the button is pressed. For example, when the "holding is ON" state is set as the initial state, the state switches to the "holding is OFF" state when the pedal or the button is pressed once. When the pedal or the button is pressed in the "holding OFF" state, the state transitions to the "pressing is ON" state.

When there is a plurality of documents, the document to which the operation is applied may be switched every time the pedal or the button is pressed. For example, in a case where there are two documents including a document 1 and a document 2, and in an initial state, both documents 1 and 2 are in the "holding is OFF" state, the state may transition as follows. When the pedal or the button is pressed in the initial state, the documents 1 and 2 both switch to the "holding is ON" state. Then, when the pedal or the button is pressed again, the document 1 switches to the "holding is ON" state. When the pedal or the button is pressed while the document 1 is in the "holding is ON" state, the document 2 switches to the "holding is ON" state. Then, when the pedal or the button is pressed while the document 2 is in the "holding is ON" state, the documents 1 and 2 return to the initial state.

As described above, by detecting the state of the pedal or the button in the movement permission determination processing, the control can be performed with the explicit operation device such as the pedal or the button. By using the explicit device such as the pedal, the movement can be permitted and prohibited through an operation such as stepping by using a body part other than hands. As a result, the hands can be efficiently used, thereby improving efficiency of a document processing operation involving frequent use of hands.

A fifth exemplary embodiment of the present disclosure is described below. According to the exemplary embodiments described above, movement permission determination of the document image is made based on the touch operation, the object detection, and the state of the explicit instruction device. However, the determination may also be made based on a voice.

More specifically, instructions such as "movement OK" and "movement NG" can be issued with a voice. More specifically, in the operation detection processing in step S9000 in FIG. 9, whether the instruction "movement OK" or "movement NG" has been issued with a voice is detected. The issued instruction can be detected by a known voice recognition technique.

The detected instruction, which uses two types, "movement OK" and "movement NG" according to the present exemplary embodiment, may be given using another keyword such as "movement permitted" and "movement prohibited". Furthermore, a sentence such as "movement is prohibited" may be input.

When there is a plurality of document images, a target document image may be designated with a voice. For example, when there are document 1 and document 2, only the document 2 may be switched to an unmovable state by the user inputting "movement of the document 2 is prohibited".

As described above, voice based control can be performed by detecting the type of an instruction issued with a voice in the movement permission determination processing. A body part such as a hand does not need to be used for the input when the voice is used. As a result, the body part can be efficiently used, whereby document processing involving frequent use of the body part can be more efficiently executed.

A sixth exemplary embodiment of the present disclosure is described below. The number of users is one in the exemplary embodiments described above. In the present exemplary embodiment, a case is described where the number of users is more than one.

Figure 16:
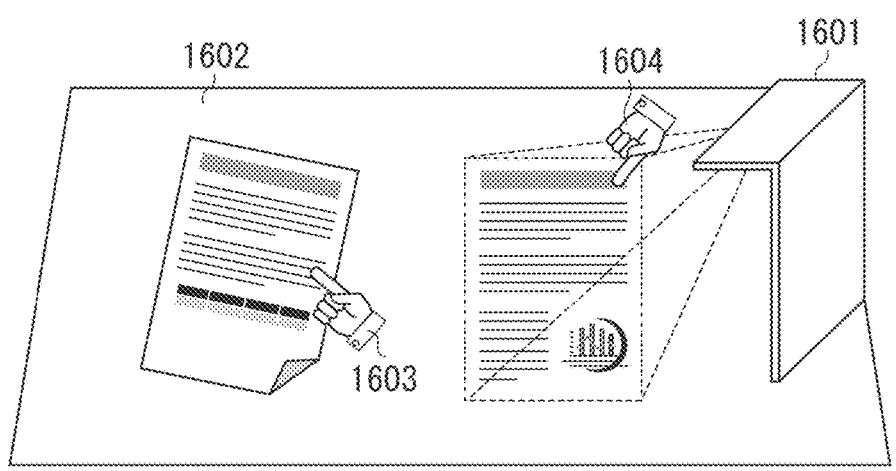
FIG. 16 is a schematic diagram illustrating an overview of a document processing system according to a sixth exemplary embodiment of the present disclosure.

FIG. 16 is a schematic diagram illustrating a case where the document processing described in the second exemplary embodiment is executed by a plurality of users. Here, two users on opposite sides of a desk 1602, on which an information processing apparatus 1601 is placed, execute the document processing. An operation 1603 is based on an instruction issued by a user 1, and an operation 1604 is based on an instruction issued by a user 2. When there is a plurality of users and the movement permission determination processing is executed across the board on the documents on the desk 1602, an intention of one operator might be wrongly reflected due to an operation of a user other than the operator. For example, when the operation of holding the document image performed by the user 2 is in effect, an operation of the user 1, which is intended as the operation of moving the document image, may be interpreted as the writing operation instead of moving operation.

To solve this problem, according to the present exemplary embodiment, information about the operator is obtained in addition to the information about the operation instruction time and the instruction coordinates when the operation information is acquired in the operation information acquisition processing in step S4010 in FIG. 4 and in the movement permission determination processing in step S4020 in FIG. 4. Then, only the operation information involving a certain operator is used for the movement permission determination, and information about the operation performed by the different user is invalidated. In this manner, the intention of the operator is correctly reflected.

A known person recognition technique is used for acquiring the operator information. For example, image data about a person who is a user is registered in advance. An image captured by a camera provided to the information processing apparatus is analyzed, and thus the person can be identified. Furthermore, a direction in which the hand of a user enters can be detected when the user's operation by gesture is detected, and a user whose hand enters in a different direction may be determined as a different user.

FIG. 17 illustrates an example of the operation information including the operator information. The operation information includes an operator ID 1701 for identifying an operator, an operation time 1702, an operation position x coordinate 1703, an operation position y coordinate 1704, and a target document ID 1705 for uniquely identifying the document as the operation target. The same operator can be identified by referring to the operator ID 1701.

As described above, since the operator information is acquired, the movement permission determination can be correctly made even when there is a plurality of operators.

If the document as the operation target is identified in addition to the operator's information, only the operation performed by a certain operator on a certain document may be performed. When there is a plurality of documents, the operator might operate the different documents at the same time. With the processing described above, the operator can operate the documents as intended when the operator operates the different documents at the same time A seventh exemplary embodiment of the present disclosure is described below. The paper document and the projected document are independent from each other according to the exemplary embodiments described above. However, according to the seventh exemplary embodiment, display control is performed such that the paper document and the projected document are associated with each other.

Figure 18:
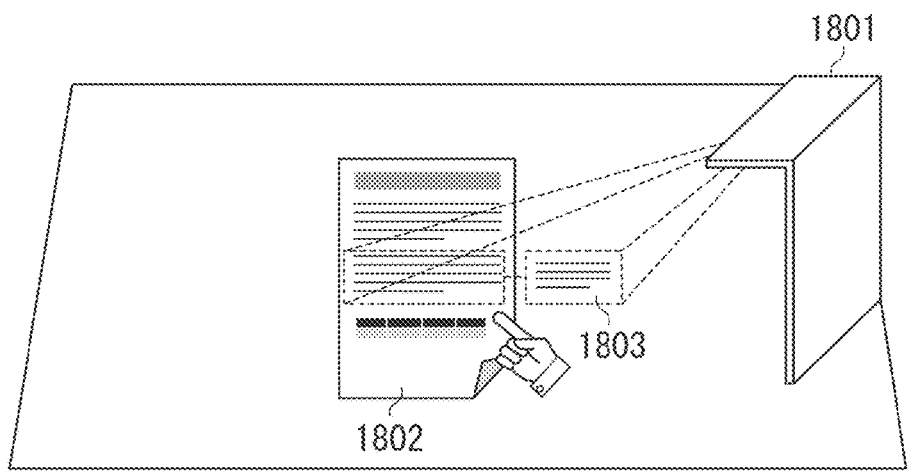
FIG. 18 is a schematic diagram illustrating an overview of a document processing system according to a seventh exemplary embodiment of the present disclosure.

FIG. 18 illustrates an example of the display control for associating the paper document and the projected document with each other. An information processing apparatus 1801 includes the projector that projects an image, the sensor that detects a gesture operation, and the camera that captures an image of the document disposed on the projection surface as image data, as in the case of the information processing apparatus 1201 according to the second exemplary embodiment. With the information processing apparatus 1801, an additional image 1803 associated with a paper document 1802 can be projected on the paper document 1802. The camera of the information processing apparatus 1801 captures the image of the paper document 1802, and the resultant image data is analyzed. Thus, the additional image 1803 associated with the content of the paper document 1802 is identified. The associated additional image 1803 is acquired from a storage device of the information processing apparatus 1801 or from another computer via a network. For example, character data is acquired through character recognition processing from the image data which is obtained by capturing a paper document image. The result of information search for the character data can be regarded as the additional image 1803.

In this manner, the additional image 1803 is projected to be displayed together with the paper document. The user may wish to treat the additional image 1803 as the same document as the paper document. The additional image 1803, however, is recognized as a document different from the paper document according to the exemplary embodiments described above.

According to the present exemplary embodiment, processing for solving this problem is described. To solve the problem, the document detection processing in step S4000 in FIG. 4 is modified according to the present exemplary embodiment. The processing other than the processing in step S4000 in FIG. 4 is similar to that in the exemplary embodiments described above.

Figure 19:
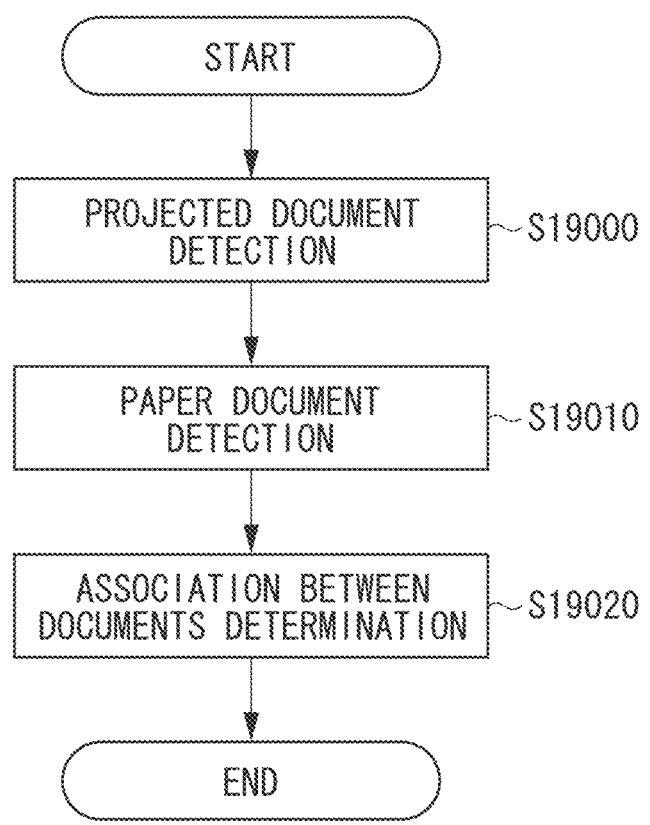
FIG. 19 is a flowchart illustrating a flow of document detection processing according to the seventh exemplary embodiment of the present disclosure.

FIG. 19 is a flowchart illustrating document detection processing according to the present exemplary embodiment in detail. In step S19000, the projected document detection processing is executed. More specifically, the displayed position and the size of the projected document are detected as the document information as shown in the processing in step S13000 in FIG. 13 described above.

In step S19010, the paper document detection processing is executed. The position and the size of the paper document placed on the projection surface are detected as the document information as shown in the processing in step S13010 in FIG. 13 described above.

In step S19020, determination of association between documents is made. Here, it is determined whether pieces of document information acquired in steps S19000 and 19010 are associated with each other. The same document ID is set to the document information determined to be associated with each other. The determination of association between documents is made by determining whether the information acquired in step S19000 is the additional information about the paper document. More specifically, the information determined as the additional information about the paper document is determined to be association information, and the information not determined as the additional information about the paper document is determined not to be association information. The determination whether the information is the additional information about the paper document is made as follows. The additional information about the paper document which is obtained in step S19010 is acquired through the method described above. Then, the additional information is compared with the projected document acquired in step S19000 to determine whether the additional information and the projected document are the same. The comparison can be made by comparing a URI that uniquely identifies the data location of the additional information or comparing data forming binary information. When the result of the comparison indicates that the information is the same, it is determined that the projected document acquired in step S19000 is associated with the paper document acquired in step S19010. On the other hand, when the result of the comparison indicates that the information is not the same, it is determined that the projected document acquired in step S19000 is not associated with the paper document acquired in step S19010.

As described above, it is determined whether the projected document and the paper document are associated with each other. Thus, the additional information about the paper document can be regarded as the same information as the paper document. Thus, the movement permission determination is made depending on whether the paper document is held, so that the writing operation on the additional information can be correctly judged. The operation information about the associated information can be acquired as information about a series of operations.

An eighth exemplary embodiment of the present disclosure is described below. According to the exemplary embodiments described above, the document is not moved when the result of the movement permission determination is movement NG. However, the paper document may be moved by an operation instruction such as the writing operation that is different from the holding operation even when the paper document is held so as not to be moved.

For example, when the paper document is not firmly held, the paper document may be moved by an operation instruction different from the holding operation. As described in the second exemplary embodiment, in a case where an operation instruction is issued by a gesture, the document might move despite a gesture of holding the document. When the user performs a spatial gesture operation with, for example, an infrared sensor, the gesture performed in space can be recognized. Accordingly, the operation may be determined as the holding operation even when the user does not actually hold the document through a physical contact. More specifically, the holding operation in a space above the paper document might be determined as an intended holding operation. On the other hand, since the paper document is not actually held through the physical contact, the paper document might be moved by another operation instruction.

When the paper document is moved by an operation instruction despite the user's intention of "movement NG", an unintended editing operation is executed. More specifically, when the paper document to be edited moves during the editing operation, the editing operation might result in editing unintended by the user. For example, when the writing operation is executed as the editing operation, if the paper document is moved, writing to an unintended portion may occur.

Figure 20:
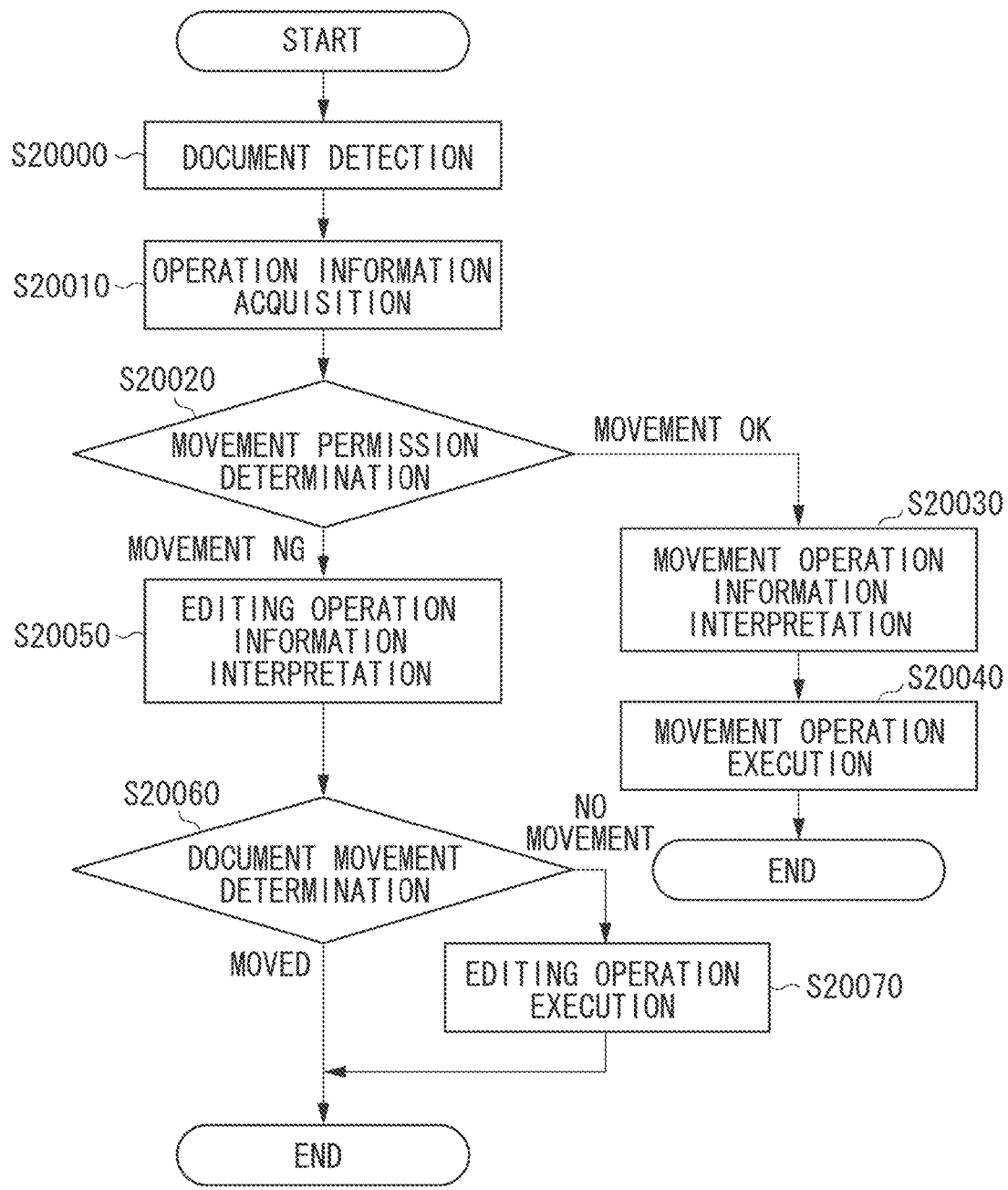
FIG. 20 is a flowchart illustrating an overall flow of processing executed in a document processing system according to an eighth exemplary embodiment of the present disclosure.

A method for solving this problem is described in the present exemplary embodiment. FIG. 20 is a flowchart illustrating an overall flow of processing according to the present exemplary embodiment.

In step S20000, the document detection processing is executed that is similar to the processing in step S4000 in FIG. 4.

In step S20010, the operation information acquisition processing is executed that is similar to the processing in step S4010 in FIG. 4.

In step S20020, the movement permission determination processing is executed that is similar to the processing in step S4020 in FIG. 4. When the result of the movement permission determination is "movement OK", the processing proceeds to step S20030. On the other hand, when the result is "movement NG", the processing proceeds to step S20050.

In step S20030, processing for interpreting movement operation information is executed that is similar to the processing in step S4030 in FIG. 4.

In step S20040, movement operation execution processing is executed that is similar to the processing in step S4040 in FIG. 4.

In step S20050, processing for interpreting editing operation information is executed that is similar to the processing in step S4050 in FIG. 4.

In step S20060, document movement determination processing is executed. In the document movement determination processing, the current document information is acquired and compared with the document information acquired in step S20000. When the position and the size of the document have changed, the result of the document information comparison is "moved", and the processing is terminated without executing the editing operation. When the position and the size of the document have not changed, the result is "no movement" and the processing proceeds to step S20070. The processing of acquiring the document information in the document movement determination is similar to the processing in step S4000 in FIG. 4.

In step S20070, editing operation execution processing is carried out that is similar to the processing in step S4060 in FIG. 4.

As described above, the document movement determination is made before an editing operation is performed, so that the editing operation is invalidated when the document unintendedly moves. Consequently, an unintended operation can be prevented from being performed. <Other exemplary embodiment>

Other Embodiments

Movement permission determination processing can be executed which is different from the movement permission determination processing according to the exemplary embodiments as described above. For example, the movement OK and movement NG state can be switched by a predetermined gesture. Moreover, a user interface (UI) for switching the state between movement OK and movement NG may be provided. For example, a graphical user interface (GUI) for switching the state between movement OK and movement NG may be put adjacent to the document image, and the state may be switched every time an instruction is issued via the GUI.

According to the exemplary embodiments described above, the movement permission determination is made based on an explicit instruction. Alternatively, the movement permission determination may be made without using the explicit instruction. For example, information about a line of sight of the user is acquired, and the movement permission determination processing is realized by using the information about the line of sight. When the line of sight is focused on a particular area on the document, the user is considered to be paying attention to the area and thus is assumed to execute the editing operation such as writing. Accordingly, the state is determined to be movement NG. On the other hand, when the line of sight is not focused on a particular area, the state may be determined to be movement OK.

Furthermore, a state in the flowchart may be employed in movement permission determination processing under an inexplicit condition. For example, an operation used for each document is defined in advance, and the state is "movement NG" until the defined operation is completed. The state can be determined to be "movement OK" when the defined operation is completed. When this processing is employed in a presentation using a document image, the state is determined to be "movement NG" until writing on a portion that needs to be explained is completed. In this case, the explanation is regarded as not completed until the writing on the needed portion is carried out. Thus, the explanation of the portion can be prevented from being omitted.

An arrangement state of the document image may be used for the movement permission determination processing under the inexplicit condition. For example, when there is a plurality of document images that overlap with each other, the movement permission determination can be made based on an overlapping amount. More specifically, the state is determined as "movement OK" when the overlapping amount of the document images is larger than a predetermined amount (significant portions of the document images overlap each other). When the overlapping amount is smaller than the predetermined amount, the state can be determined as movement OK or movement NG through the processing according to the exemplary embodiments. When an image is written on an upper side of the overlapping documents, the image may be projected on a lower side of the documents. In this processing, the user instruction is interpreted as the movement when the overlapping amount is large, so that the projection can be prevented from occurring.

The operation target of the gesture operation, which is a two dimensional document image according to the exemplary embodiments described above, may be a three dimensional object. More specifically, the position and the size of the three dimensional object are detected with, for example, a sensor for acquiring a three dimensional image as in the case of detecting the document information. Then, the editing operation on the three dimensional object may be switched over in accordance with the result of the movement permission determination. Here, the movement permission processing may be the processing according to the exemplary embodiments described above, or may be processing employing a different method. For example, the movement permission determination may be made based on whether a predetermined gesture in a three dimensional space has been performed.

According to the present disclosure, it is determined whether the movement of the document image is permitted based on whether predetermined first operation information about the document image is acquired. Then, second operation information about the document image is interpreted based on the result of the determination. Thus, difficult-to-distinguish operations can be easily distinguished from each other.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-143673, filed Jul. 11, 2014, which is hereby incorporated by reference herein in its entirety.

What is claimed is:

1. An information processing apparatus comprising:
a projection unit;
one or more memories storing instructions; and one or more processors which, when executing the instructions, causes the information processing apparatus to perform:

acquiring operation information as an instruction to an image projected on a projection surface by the projection unit; and executing movement processing of the projected image based on movement permission determination of second operation information involving transit of instruction coordinates from a first position to a second position of the projected image in a case where first operation information is not acquired, and executing image processing on the projected image based on movement permission determination of the second operation information in a case where the first operation information has been acquired indicating that the instruction coordinates change, wherein processing based on the second operation information is different between when the first operation information is acquired and when the first operation information is not acquired, and wherein the projection unit is configured to project a document image, and in a case where the projection unit projects additional information associated with a paper document of the projected document image near the projected document image and the first operation information is acquired within a projected image obtained by the document image being projected, image processing is executed on the additional information based on the second operation information acquired within an area of the additional information if the first operation information is not acquired within the area of the additional information.

2. The information processing apparatus according to claim 1, wherein the information processing apparatus further performs determining whether movement of the projected image is permitted based on whether the first operation information has been acquired, wherein the executing executes the image processing on the projected image based on the second operation information in a case where the determining has determined that the movement is prohibited.

3. The information processing apparatus according to claim 1, wherein the image processing is editing processing.

4. The information processing apparatus according to claim 3, wherein the editing processing indicates writing processing on the projected image.

5. The information processing apparatus according to claim 3, wherein the editing processing indicates processing for selecting an area in the projected image.

6. The information processing apparatus according to claim 1, wherein the movement processing is page switching.

7. The information processing apparatus according to claim 1, wherein the first operation information is operation information indicating that the projected image is held.

8. The information processing apparatus according to claim 1, wherein the executing acquires the operation information with an acquired position of the instruction coordinates each time a predetermined time period elapses.

9. The information processing apparatus according to claim 1, wherein in a case where instruction coordinates included in the operation information is present within an area of the projected image, the acquiring associates the projected image with the operation information.

10. The information processing apparatus according to claim 2, wherein the information processing apparatus further performs detecting the projected image, wherein in a case where the detecting detects a plurality of projected images, if the plurality of projected images is associated, the acquiring acquires operation information for the projected image that are associated as a series of operation information.

11. The information processing apparatus according to claim 10, wherein in a case where the detecting detects a plurality of projected images, and wherein the determining determines whether the movement is permitted for each of the projected images.

12. The information processing apparatus according to claim 1, wherein a position of the image projected by the projection unit is moved by the movement processing by the executing.

13. The information processing apparatus according to claim 1, wherein in the image processing executed by the executing, the projection unit is configured to project a trail according to the transit of the instruction as to the first position to the instruction as to the second position.

14. The information processing apparatus according to claim 1, wherein in a case where the projection unit projects an image associated with the document image near the document image, and the acquiring has acquired the first operation information within an area of the projected image, the executing applies the first operation information to the associated image, and executes the image processing on the associated image based on the second operation information acquired within the area of the associated image.

15. An information processing method comprising:

acquiring operation information as an instruction to an image projected by a projection unit; and executing movement processing of the projected image based on movement permission determination of second operation information involving transit of instruction coordinates from a first position to a second position of the projected image in a case where first operation information is not acquired, and executing image processing on the projected image based on movement permission determination of the second operation information when the first operation information has been acquired indicating that the instruction coordinates change, wherein processing based on the second operation information is different between when the first operation information is acquired and when the first operation information is not acquired, and wherein the projection unit is configured to project a document image, and in a case where the projection unit projects additional information associated with a paper document of the projected document image near the projected document image and the first operation information is acquired within a projected image obtained by the document image being projected, image processing is executed on the additional information based on the second operation information acquired within an area of the additional information if the first operation information is not acquired within the area of the additional information.

16. A non-transitory computer-readable storage medium holding a program causing a computer to execute the steps of:

acquiring operation information as an instruction to an image projected by a projection unit; and executing movement processing of the projected image based on movement permission determination of second operation information involving transit of instruction coordinates from a first position to a second position of the projected image in a case where first operation information is not acquired, and executing image processing on the projected image based on movement permission determination of the second operation information in a case where the first operation information has been acquired indicating that the instruction coordinates change, wherein processing based on the second operation information is different between when the first operation information is acquired and when the first operation information is not acquired, and wherein the projection unit is configured to project a document image, and in a case where the projection unit projects additional information associated with a paper document of the projected document image near the projected document image and the first operation information is acquired within a projected image obtained by the document image being projected, image processing is executed on the additional information based on the second operation information acquired within an area of the additional information if the first operation information is not acquired within the area of the additional information.

17. An information processing apparatus comprising:
a projection unit;
one or more memories storing instructions; and
one or more processors which, when executing the instructions, causes the information processing apparatus to perform:

acquiring operation information as an instruction to an image projected on a projection surface by the projection unit;

determining whether the first operation information is acquired in the acquiring, the first operation information indicating that instruction coordinates change; and executing movement processing of the projected image based on movement permission determination of second operation information involving transit of instruction coordinates from a first position to a second position of the projected image in a case where it is determined that the first operation information is not acquired, and executing image processing on the projected image based on movement permission determination of the second operation information in a case where it is determined that the first operation information is acquired indicating that the instruction coordinates change, wherein processing based on the second operation information is different between when the first operation information is acquired and when the first operation information is not acquired, and wherein the projection unit is configured to project a document image, and in a case where the projection unit projects additional information associated with a paper document of the projected document image near the projected document image and the first operation information is acquired within a projected image obtained by the document image being projected, image processing is executed on the additional information based on the second operation information acquired within an area of the additional information if the first operation information is not acquired within the area of the additional information.

* * * * *